United States Patent
Enderwitz et al.

(10) Patent No.: US 12,365,615 B2
(45) Date of Patent: Jul. 22, 2025

(54) APPARATUS FOR THE AUTOMATED PRODUCTION OF GLASS ASSEMBLIES AND CORRESPONDING METHOD

(71) Applicant: Endress+Hauser Conducta GmbH+Co. KG, Gerlingen (DE)

(72) Inventors: Carsten Enderwitz, Dresden (DE); Roland Zilly, Jahnsdorf (DE); Jens Voigtländer, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 18/485,907

(22) Filed: Oct. 12, 2023

(65) Prior Publication Data

US 2024/0043310 A1 Feb. 8, 2024

Related U.S. Application Data

(62) Division of application No. 17/095,893, filed on Nov. 12, 2020, now abandoned.

(30) Foreign Application Priority Data

Nov. 12, 2019 (DE) ...................... 10 2019 130 477.6

(51) Int. Cl.
*C03B 23/07* (2006.01)
*C03B 9/36* (2006.01)
(Continued)

(52) U.S. Cl.
CPC ............ *C03B 23/07* (2013.01); *C03B 9/3636* (2013.01); *C03B 9/41* (2013.01); *C03B 23/043* (2013.01);
(Continued)

(58) Field of Classification Search
None
See application file for complete search history.

(56) References Cited

U.S. PATENT DOCUMENTS

| 458,190 | A | * | 8/1891 | Ripley | .................... C03B 9/165 65/261 |
| 759,742 | A | * | 5/1904 | Owens | ...................... C03B 9/22 65/73 |

OTHER PUBLICATIONS

DE 102016112258 machine translation, Voigtlander et al., Method for the automated production of glass assemblies, Mar. 2017 (Year: 2017).*

(Continued)

*Primary Examiner* — Queenie S Dehghan
(74) *Attorney, Agent, or Firm* — Christopher R. Powers; Endress+Hauser (USA) Holding, Inc.

(57) ABSTRACT

An apparatus for the automated production of glass assemblies includes: a turning machine with at least two spindles, which are rotatable about a common axis of rotation and which each have a workpiece holder, wherein the workpiece holders are arranged opposite one another; one or more gas burners or lasers fixed on a first tool carriage which is movable in parallel and/or perpendicularly to the axis of rotation; one or more drives for driving a rotational movement of the spindles and a movement of the first tool carriage; a pressure module including a pump device at least one working cylinder for applying a pressure to an inner tube and/or to a space between the inner tube and an outer tube; and a control unit configured to control the burners or lasers, one or more drives, the first tool carriage and the pressure module.

12 Claims, 4 Drawing Sheets

(51) Int. Cl.
- *C03B 9/41* (2006.01)
- *C03B 23/00* (2006.01)
- *C03B 23/043* (2006.01)
- *C03B 23/045* (2006.01)
- *C03B 23/055* (2006.01)
- *C03C 23/00* (2006.01)
- *G01N 27/36* (2006.01)
- *G01N 27/416* (2006.01)

(52) U.S. Cl.
CPC .......... *C03B 23/045* (2013.01); *C03B 23/055* (2013.01); *C03C 23/0025* (2013.01); *G01N 27/36* (2013.01); *G01N 27/4167* (2013.01)

(56) References Cited

OTHER PUBLICATIONS

DE 112016002864 machine translation, Ozawa Koji et al., Air Pump Device Using an Electric Actuator and Air Pump System, Mar. 2018 (Year: 2018).*

\* cited by examiner

APPARATUS FOR THE AUTOMATED PRODUCTION OF GLASS ASSEMBLIES AND CORRESPONDING METHOD

CROSS-REFERENCE TO RELATED APPLICATION

The present application is related to and claims the priority benefit of German Patent Application No. 10 2019 130 477.6, filed Nov. 12, 2019, and U.S. patent application Ser. No. 17/095,893, filed Nov. 12, 2020, the entire contents of which are incorporated herein by reference.

TECHNICAL FIELD

The present disclosure relates to an apparatus for the automated production of glass assemblies and to a corresponding method.

BACKGROUND

A potentiometric pH sensor for detecting the pH value of a measuring liquid by means of a pH-sensitive glass electrode typically comprises a glass assembly with two coaxially arranged glass tubes, wherein the outer glass tube is connected at one end to the inner glass tube so that the outer glass tube is closed at this end. In a pH sensor with a glass electrode, the inner glass tube is closed at this end with a pH-sensitive glass membrane. The end section of the sensor comprising the connection point of the inner glass tube with the outer glass tube and the glass membrane is provided to be brought into contact with the measuring liquid, for example by immersion. This end section of the glass assembly comprises at least one diaphragm, via which an electrochemical connection is ensured between a reference electrode, which is arranged in the chamber formed between the outer glass tube and the inner glass tube, and a medium surrounding the sensor.

In the conventional production of glass assemblies, the material is processed by the following processes, for example: melting, blowing-in by means of air supply from the inside, drawing, compression, molding with tools, and the like.

Solenoid valves or mass flow controllers are used for blowing in air. Solenoid valves switch a predefined air flow on and off in a pulse-like manner, the pulse duration being determined via the magnitude of the introduced air flow. Mass flow controllers define the introduced volume of air but cannot change the pressure. Both systems are constructed as open systems, that is, the component is not connected to the pressure control in an airtight manner.

The conventional production of such glass assemblies thus requires a great deal of manual labor of an experienced glassblower and is highly complex.

SUMMARY

The object of the present disclosure is to provide a more efficient method for the automatic production of generic glass assemblies, which method enables a higher throughput, advantageously with a constant or improved quality of the glass assemblies produced.

The object is achieved by an apparatus which has an outer tube and an inner tube running inside the outer tube, wherein the inner tube and the outer tube are arranged coaxially, and wherein one end of the inner tube is connected in a firmly bonded manner, for example, fused, to a tube wall of the outer tube, comprising: a turning machine with at least two spindles which are rotatable about a common axis of rotation and which each have a workpiece holder, wherein the workpiece holders are arranged opposite one another; one or more gas burners or lasers fixed on a first tool carriage which is movable in parallel and/or perpendicularly to the axis of rotation of the spindles; one or more drives for driving a rotational movement of the spindles and a movement of the first tool carriage; a pressure module comprising a pump device for applying a pressure to the inner tube and/or to a space between the inner tube and the outer tube, wherein the pump device for applying the pressure comprises at least one working cylinder, for example, a pneumatic cylinder, a hydraulic cylinder or an electric cylinder; and a control unit which is designed to control the burners or lasers, one or more drives of the spindles, the first tool carriage, and the pressure module.

One embodiment provides that the pressure module comprises a pressure sensor, and a regulation of the pressure in the inner tube and/or in the space between the inner tube and the outer tube takes place to a target value and controls the pump device accordingly.

Thus, a finely metered pressure can be directed into a glass assembly for its processing. The pressure may be positive or negative. Any wear in the mechanism is automatically readjusted, for example, by the pressure sensor feeding back the actual value of the pressure.

One embodiment provides that the apparatus furthermore comprises a camera which is connected to the control unit in order to communicate digital image data to the control unit. The camera is installed.

One embodiment provides that the apparatus furthermore comprises a second tool carriage which is movable in parallel and/or perpendicularly to the axis of rotation of the spindles and on which a camera is arranged, which is connected to the control unit in order to communicate digital image data to the control unit.

One embodiment provides that the working cylinder comprises a piston rod and a movement back and forth is possible.

One embodiment provides that at least one workpiece holder has a seal, for example, a shaft sealing ring.

One embodiment provides that the working cylinder comprises a rotary encoder.

One embodiment provides that the pressure module comprises an opening valve, by means of which rapid opening and discharging of the pressure in the inner tube and/or in the space between the inner tube and the outer tube is made possible.

One embodiment provides that at least one workpiece holder is designed to be movable in the direction of the further workpiece holder.

One embodiment provides that the apparatus comprises a tool for processing the outer tube; the tool is, for example, arranged on a third tool carriage which is movable in parallel and/or perpendicularly to the axis of rotation of the spindles.

The object is furthermore achieved by a method for the automated production of glass assemblies by means of a described apparatus, wherein the glass assemblies each have an outer tube and an inner tube running inside the outer tube, wherein the inner tube and the outer tube are arranged coaxially, and wherein one end of the inner tube is connected in a firmly bonded manner, for example, fused, to a tube wall of the outer tube, comprising the steps of: production of a glass body comprising an outer tube and two inner tubes arranged inside the outer tube and arranged one behind the other coaxially to an axis of rotation of the outer tube, wherein the inner tubes are connected in a firmly bonded manner, for example, fused, to the outer tube at their end turned toward the respective other inner tube; and application of a pressure to the inner tube and/or to a space between the inner tube and the outer tube, wherein the method is carried out by means of an automatic control unit.

One embodiment provides the method step of splitting the glass body into two separate glass assemblies.

One embodiment provides the method step of regulating the pressure in the inner tube and/or in the space between the inner tube and the outer tube to a target value.

One embodiment provides the method steps of recording image data of the glass body; and controlling the production of the glass body, the application of the pressure, and/or the splitting of the glass body by means of the recorded image data.

One embodiment provides the method step of moving at least one workpiece holder in the direction of the other workpiece holder for drawing or compressing the glass body.

One embodiment provides the method step of processing the outer tube by means of a tool.

BRIEF DESCRIPTION OF THE DRAWINGS

This is explained in more detail with reference to the following figures.

DETAILED DESCRIPTION

Figure 1:
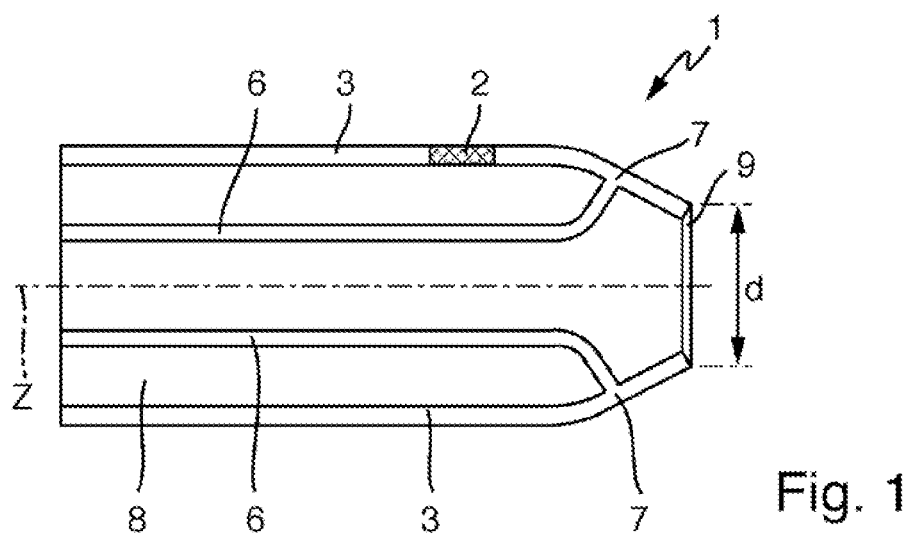
FIG. 1 shows a schematically illustrated glass assembly for a potentiometric pH sensor.

FIG. 1 schematically illustrates a glass assembly 1 that can be processed to produce a potentiometric sensor, for example, a pH sensor. The glass assembly 1 has an inner tube 6 and an outer tube 3, which are arranged coaxially with respect to their common axis of rotation Z. A diaphragm 2 is arranged in the tube wall of the outer tube 3 and connected in a firmly bonded manner to the tube wall of the outer tube 3 by fusing into the tube wall. The diaphragm 2 is respectively formed by a cylindrical porous ceramic body.

At a connection point 7, the inner tube 6 and the outer tube 3 are fused together. The connection point 7 closes one end of an annular chamber 8 formed between the inner tube 6 and the outer tube 3. The inner tube 6 is open at its end 9 located in the area of the connection point 7.

The production of a pH sensor with a glass electrode made of the glass assembly 1 may, for example, be carried out in the following manner. A pH-sensitive glass membrane that closes the inner tube 6 at the front side can be blown onto the front, open end 9 of the glass assembly 1. A buffer solution and a potential discharger are then introduced into the inner tube 6. A reference electrolyte and a reference electrode are introduced into the chamber 8 formed between the inner tube 6 and the outer tube 3. The glass assembly 1 can then be closed on the rear side, wherein the reference electrode and the potential discharger are conducted to a contact point which is arranged outside the chambers that are formed in the glass assembly 1 and filled with electrolyte. The contact point may be connected to a measuring circuit, which may be arranged in an electronic housing that is connected firmly at the rear side to the glass assembly and that can be designed, for example, as a plug head.

A glass membrane may be blown onto the front, open end 9 of the inner tube 3 in an automated manner. The thickness of the glass membrane thus automatically produced depends on the opening diameter d of the open end 9 of the inner tube 3. For series production of glass assemblies such as those illustrated in FIG. 1 by means of an automatic method, it is thus desirable for the method to provide for the production of the glass assemblies with the smallest possible variance of the opening diameters d.

Figure 2:
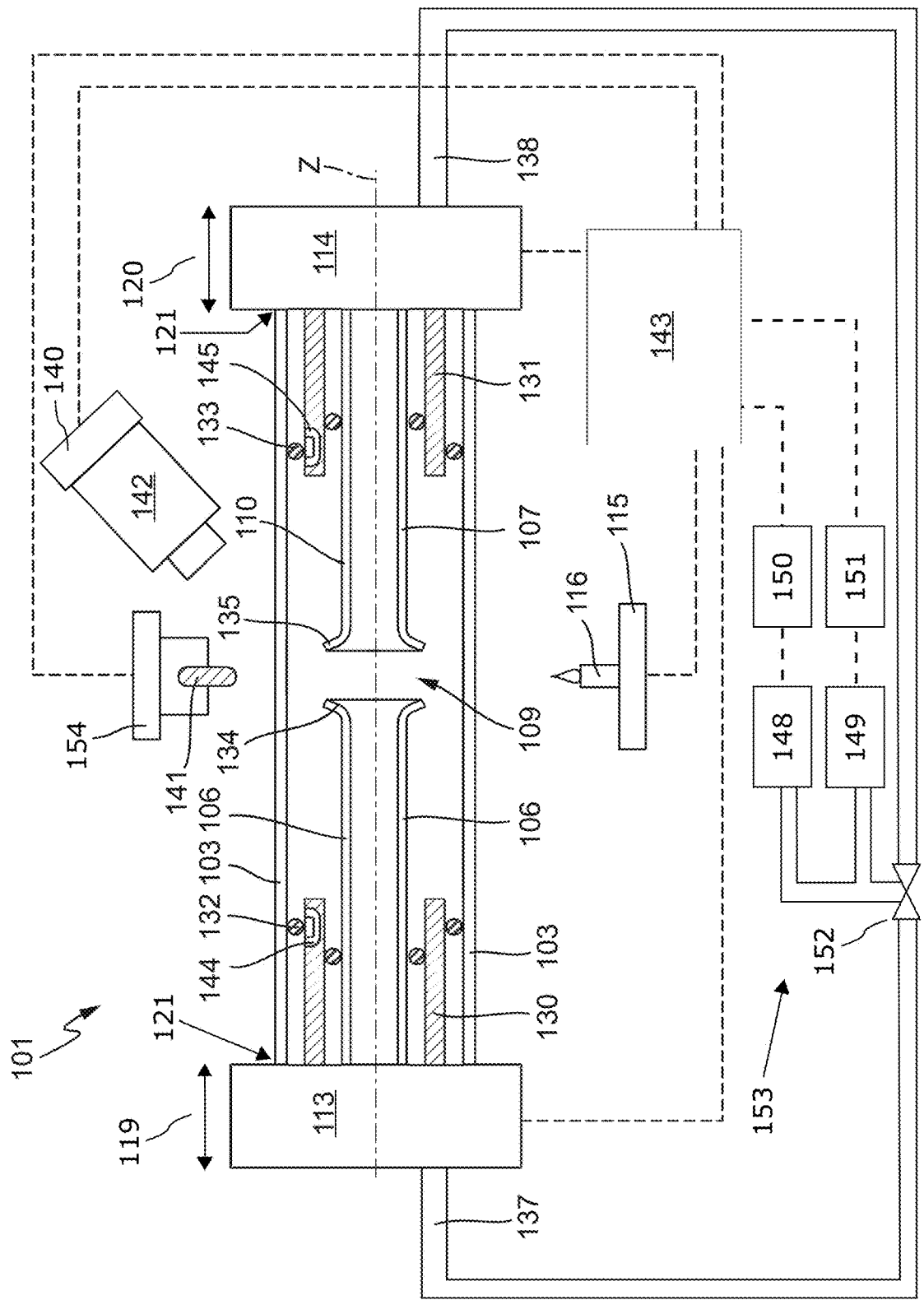
FIG. 2 shows a schematic illustration of an apparatus for the automated production of glass assemblies such as those illustrated in FIG. 1.

FIG. 2 schematically shows an apparatus 101 for producing such glass assemblies. The apparatus 101 comprises a turning machine with opposing spindles 113, 114 rotatable about a common axis of rotation Z. An outer tube 103 made of glass is clamped at its first end in a workpiece holder of the first spindle 113 and at its second end in a workpiece holder of the second spindle 114. A first inner tube 106 made of glass is held in the workpiece holder of the first spindle 113 and a second inner tube 110 made of glass is held in the workpiece holder of the second spindle, wherein the first inner tube 106, the second inner tube 110, and the outer tube 103 are coaxially arranged. This is ensured by two centering aids 130, 131, which have a cylindrical body made of stainless steel. The centering aids 130, 131 have a front-side holder, in which a section of the respective inner tube 106, 110 is arranged and fixed. In the present example, the cylinder axis of the centering aids coincides with the axis of rotation of the inner tubes 106, 110 and the axis of rotation Z of the spindles 113, 114. One end section of the inner tubes 106, 110 respectively projects from the holder of the centering aid 130, 131. The glass assembly 102 is provided with a seal 121 on each side so that a gas-tight seal results. The seal 121 for clamping the assembly 102 is, for example, a shaft seal.

The first and/or the second spindle 113, 114 is mounted in a movable manner. Thus, the spindles 113, 114 can move with respect to one another. This is indicated by the reference signs 119 and 120 respectively. Thus, an assembly 102 clamped therebetween can be compressed or stretched upon corresponding heating by a burner 116, see below. The camera 142, see below, monitors the process. A target value for a corresponding geometry of the assembly 102 is stored in a memory of a control unit 143, see below, so that automatic regulation results.

A centering ring 132, 133 is arranged between the outer wall of the centering aids 130 and 131 and the inner wall of the outer tube 103 and rests against the inner wall of the outer tube 103 and the outer wall of the respective centering aid 130, 131. The inner tubes 106, 110 each have an annular or disk-shaped radial enlargement 134, 135 on ends turned toward one another.

A first gas supply line 137 opens into the interior of the first inner tube 106 and/or into the interior of the outer tube 103 (only schematically indicated in FIG. 2). A second gas supply line 138 opens into the interior of the second inner tube 110 and/or into the interior of the outer tube 103. Gas can be blown through the tubes 103, 106, 110 via the gas supply lines 137, 138, and a desired gas pressure can be set during processing.

The apparatus 101 comprises a first tool carriage 115 and one or more gas burners arranged thereon, indicated only schematically in FIG. 2 as a single gas burner 116, which can be moved relative to the axis of rotation Z or to the glass tubes clamped in the spindles 113, 114 by means of the tool carriage 115 and/or a burner support optionally arranged on the tool carriage 115. Instead of the gas burners, other heat sources, for example lasers, may alternatively also be used. It is also possible to combine gas burners and lasers, for example in such a manner that individual method steps are carried out with laser processing, others with gas flames. The method described below as an example utilizes only gas flames.

The apparatus 101 furthermore comprises a further tool carriage 154 (a third tool carriage within the meaning of this application) on which a gray cast shaping roller 141 is arranged and which is rotatably mounted about an axis running in parallel to the axis of rotation Z. The shaping roller 141 is movable perpendicularly to the axis of rotation Z by means of the tool carriage 154 and can be brought into contact with the outer tube 103 in order to process the outer tube 103.

In addition, the apparatus 101 comprises a camera 142 that is aligned with respect to the tube arrangement formed from the tubes 103, 106, and 110, in such a manner that it is able to record images of a central area of the tube arrangement, hereinafter referred to as the processing center 109. In the exemplary embodiment shown here, the camera 142 is a digital camera. The camera is mounted on a second tool carriage 140 in a movable manner. The camera may also be installed in a stationary manner.

The apparatus 101 comprises a pressure module 153. Reference sign 148 designates a pump device for applying a pressure to an inner tube 106, 110 and/or to a space between the inner tube 106, 110 and the outer tube 103. The pump device 148 is controlled via a data transmission device 151 by a control unit 143, see below. Furthermore, a pressure measuring device 149 in the form of a pressure sensor is arranged, which detects the pressure in the inner tube 106, 110 and/or at the space between the inner tube 106, 110 and the outer tube 103 and transmits it via a transmission device 150 to the control unit 143. In this manner, a control loop is formed in order to control to a target value stored in a memory of the control unit 143. The target value may also be designed as a time-variable function.

The pump device 148 for applying the pressure comprises at least one working cylinder, for example, a pneumatic cylinder, a hydraulic cylinder or an electric cylinder. The working cylinder comprises a piston rod and makes movement back and forth possible. Pressure thus cannot only be introduced but can also be discharged again without the glass body 102 having to be detached from the seal 121. It is thus possible to introduce extended geometries into the glass. The working cylinder comprises a rotary encoder so that precise metering of the pressure is possible. The pressure module 153 comprises an opening valve 152, by means of which rapid opening and discharging of the pressure in the inner tube 106, 110 and/or in the space between the inner tube 16, 110 and the outer tube 103 is made possible.

The apparatus 101 furthermore comprises a control unit 143, which controls the drives of the spindles 113, 114, the drives of the tool carriages 115, 140, the applied pressure with which gas is blown into the tube arrangement via the gas supply lines 137 and/or 138 and controls the gas burner(s) 116, for carrying out the method described here according to a predetermined operating program. For controlling and/or regulating the blowing pressure, the control device can use measured values of one or more pressure sensors, which detect the gas pressure in the gas supply lines.

In order to control and/or regulate the gas burners, the control unit uses measured values of one or more pyrometers, which measure the temperature of the areas of the tube arrangement heated by means of the gas burners 116. All steps described here and below are carried out in an automated manner in the present example by means of the control unit 143.

The control unit 143 may include an electronic data processing device, such as a conventional PC, or a different programmable control unit. It is connected to the camera 142 in order to control the same for recording image data of the processing center 109 and/or to receive and further process image data recorded by the camera 142.

For the production of glass assemblies such as those illustrated in FIG. 1, the apparatus 101 is operated in the following manner by means of the control unit 143.

In a first step, a glass body is produced by fusing the inner tubes 106, 110 by melting the two inner tubes 106, 110 at their end turned toward the respective other inner tube with the outer tube 103. For this purpose, the tube arrangement is heated at the processing center 109 by means of a gas burner 116 arranged on the carriage 115. The processing temperature at the processing center 109 is controlled by means of the control unit 143, as previously indicated. In this case, the spindles 113, 114 rotate about the axis Z so that a uniform heating is ensured over the entire circumference of the tube arrangement at the processing center 109. Due to the heating, optionally assisted by an expansion of the distance of the spindles 113, 114 in the direction of the axis of rotation Z, the diameter of the outer tube 103 in the heated area is narrowed to such an extent that the outer tube 103 comes into contact with the enlarged areas 134, 135 of the inner tubes and is fused with them. In the process, the camera 142 records image data of the tube arrangement in the area of the processing center 109.

Figure 3:
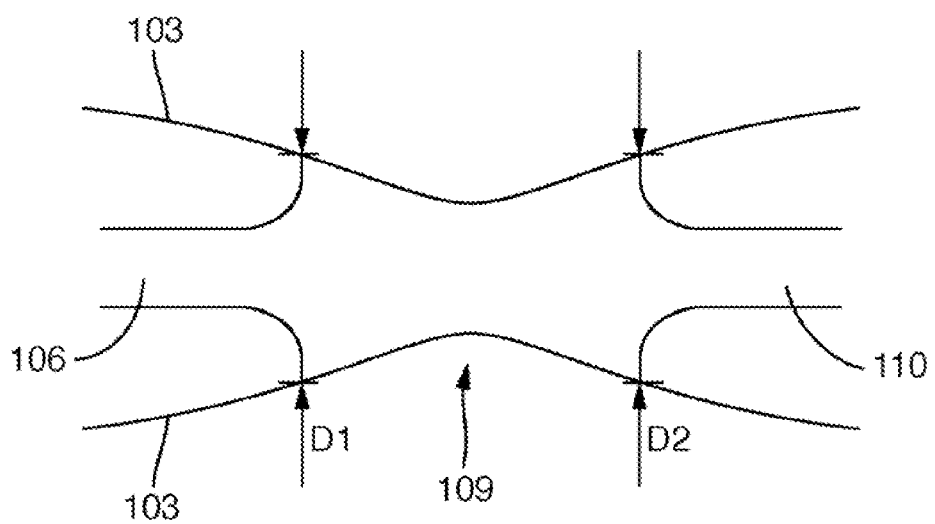
FIG. 3 shows a schematic illustration of a section of a glass body for the simultaneous production of two glass assemblies such as those shown in FIG. 1.

FIG. 3 schematically illustrates the processing center 109 of the tube arrangement shown in FIG. 2 during the fusion of the outer tube 103 with the inner tubes 106, 110. After the subsequent separation of the glass body into two individual glass assemblies corresponding to the glass assembly shown in FIG. 1, the outer diameter of the outer tube 103 in the area of the connection points determines the opening diameter d (cf. FIG. 1) of the open end at which the separation has taken place. By means of the image data recorded by the camera 142, the outer diameters are recorded and monitored by the control unit 143 during the fusion. In a memory of the control unit 143, a target value of the outer diameter is stored as a limit diameter. Upon reaching the predetermined limit diameter, the control unit 143 terminates the fusion process and continues the method with the next method step. As a result of the production, the outer diameters of the end-side enlargements of different inner tubes in series production according to the method described here have a certain variance so that the setting of a desired outer diameter requires a different length of processing time during fusing, depending on the diameter of the enlargement. The tolerance field of the opening diameters d of the glass assemblies produced in series production can be reduced by controlling the outer diameters at the fusion points.

A single glass body is formed from the tube arrangement shown in FIG. 2 by fusing the inner tubes 106, 110 with the outer tube 103. This glass body is then processed in the processing center or heated by means of the gas burner 116 using the shaping roller 141.

Figure 4A:
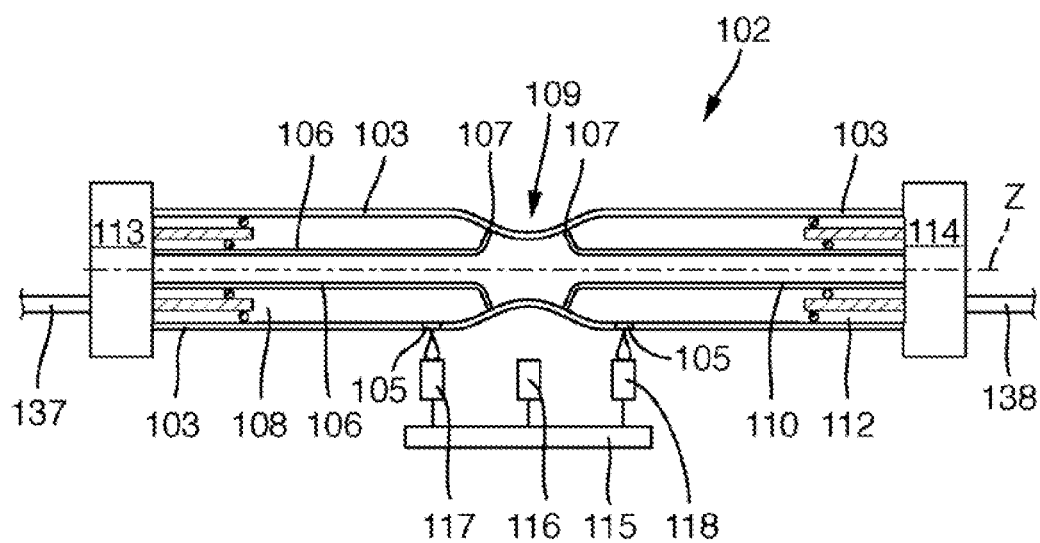
FIG. 4a shows a schematic illustration of the production of two through-openings in a wall of an outer tube of the glass body.

The resulting glass body 102 is shown in FIG. 4a. The outer tube 103 is now connected to the first inner tube 106 at the connection point 107 and to the second inner tube 110 at the connection point 111. As a result, a first annular chamber 108 is formed between the first inner tube 106 and the outer tube 103, and a second annular chamber 112 is formed between the second inner tube 110 and the outer tube 103.

Figure 4B:
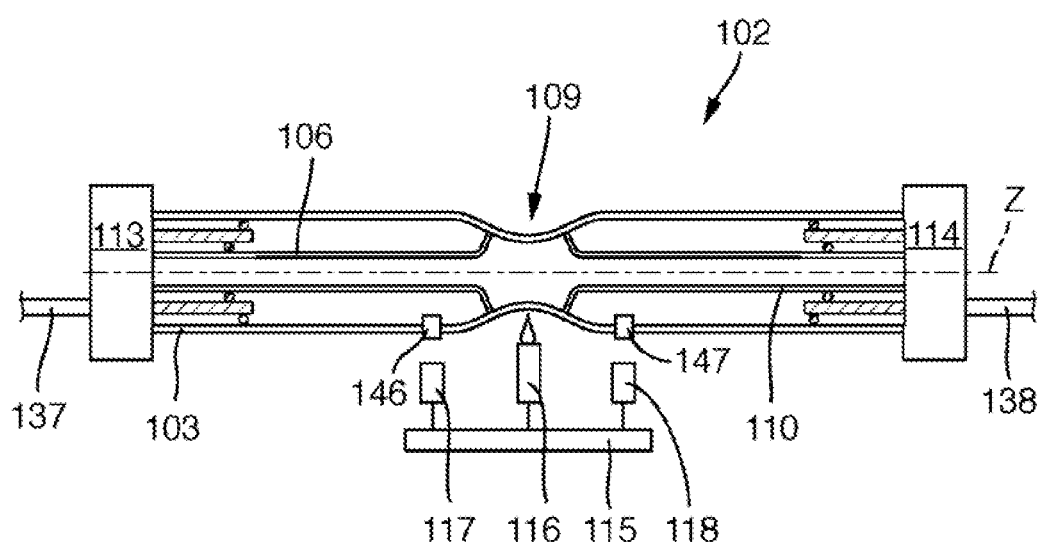
FIG. 4b shows a schematic illustration of the splitting of the glass body into two separate glass assemblies such as those illustrated in FIG. 1.

In order to produce openings for a diaphragm in the wall of the outer tube 103, two gas burners 117, 118 arranged on the tool carriage 115 are each approximated to a position with a predetermined distance from the processing center on the outer side of the outer tube 103. By means of the gas burners 117, 118, the outer tube 103 is locally heated at these positions. At the same time, by introducing gas, for example air, into the annular chambers 108, 112 via the gas supply lines 137, 138, the pressure inside the annular chambers 108, 112 is increased so that openings 105 are formed in the tube wall when the tube wall softens in the heated area. The gas can enter the otherwise closed annular chambers 108, 112 via channels 144, 145 arranged in the centering aids 130, 131. Porous ceramic diaphragms 146, 147 (cf. FIG. 4b) are inserted into the openings 105 in one step and are melted by means of the gas burners 117, 118.

In a final step (FIG. 4b), using a gas-oxygen flame of one of the gas burners 116, the glass body is split at the processing center 109 into two separate glass assemblies, both corresponding to the glass assembly illustrated in FIG. 1, while at the same time gas, for example air, is blown in via the gas supply lines 137, 138 through the inner tubes 106, 110 in the direction of the processing center. For this purpose, the control unit 143 controls both the gas flame and the blowing pressure in such a manner that, when the glass body 102 is split into two separate glass assemblies, the ends 9 turned toward one another of the two glass assemblies (FIG. 1) resulting from the separation remain open. The blowing pressure data and associated exposure times of the heat source and of the blowing pressure are stored in the operating program of the control unit 143.

In a final step, the ends turned toward one another of the glass assemblies resulting from the separation are thermally expanded by a heat treatment by means of a gas burner 116.

The invention claimed is:

1. A method for the automated production of glass assemblies of glass electrodes, wherein each glass assembly includes an outer tube and an inner tube extending inside the outer tube, wherein the inner tube and the outer tube are arranged coaxially, and wherein one end of the inner tube is fixedly bonded to a tube wall of the outer tube, the method comprising:
assembling a glass body comprising an outer tube and two inner tubes within a turning machine, which includes at least two spindles, which are rotatable about a common axis of rotation and which each have a workpiece holder,
wherein the workpiece holders are arranged opposite one another, and
wherein each inner tube is oriented and arranged end to end coaxially with the axis of rotation within the outer tube;
fixedly bonding each inner tube to the outer tube at an end adjacent the respective other inner tube by heating the end adjacent the respective other inner tube via the outer tube while rotating the at least two spindles so as to uniformly heat the outer tube and said adjacent ends of the two inner tubes,
wherein an annular chamber is thereby formed between each inner tube and the outer tube; and
selectively applying a positive and/or negative pressure in each inner tube and/or each annular chamber via a pressure module during the bonding of each inner tube to the outer tube,
wherein the method is performed automatically using a control unit configured to control:
operation of drives powering the at least two spindles;
heating of each adjacent inner tube end via the outer tube; and
the pressure in each inner tube and/or each annular chamber via the pressure module, wherein the pressure module includes at least one working cylinder and is configured to generate both the positive pressure and the negative pressure in each inner tube and each annular chamber.

2. The method of claim 1, further comprising:
splitting the glass body with the two inner tubes bonded thereto into two separate glass assemblies, each including one inner tube; and
while splitting the glass body, controlling the pressure in each inner tube and/or each annular chamber via the pressure module.

3. The method of claim 2, further comprising:
recording image data of the glass body; and
controlling the assembling of the glass body, the applying of the pressure, and/or the splitting of the glass body using the recorded image data via the control unit.

4. The method of claim 2, wherein the heating of each inner tube via the outer tube and the applying of the pressure in each inner tube and/or each annular chamber are performed according to exposure time data and pressure data, respectively, stored in the control unit.

5. The method of claim 1, further comprising regulating the pressure in each inner tube and/or each annular chamber to a target value using feedback from a pressure sensor in communication with each inner tube and/or each annular chamber.

6. The method of claim 1, further comprising moving at least one workpiece holder in a direction of the other workpiece holder or opposite thereto so as to compress or draw the glass body.

7. The method of claim 1, further comprising shaping the outer tube using a tool.

8. The method of claim 1, wherein each inner tube is fused to the tube wall of the outer tube by the heating.

9. The method of claim 1, wherein the at least one working cylinder comprises a piston rod configured to enable movement back and forth.

10. The method of claim 1, wherein the at least one working cylinder is a pneumatic cylinder, a hydraulic cylinder or an electric cylinder.

11. The method of claim 1, wherein the at least one working cylinder includes a rotary encoder to enable precise metering of the pressure generated by the at least one working cylinder.

12. The method of claim 1, wherein selectively applying a positive and/or negative pressure in each inner tube and/or each annular chamber includes rapidly discharging of the pressure via a valve of the pressure module.

* * * * *